United States Patent [19]

Moring et al.

[11] 4,048,362

[45] Sept. 13, 1977

[54] REINFORCED ELASTOMERIC ARTICLES

[75] Inventors: Peter Lothar Ernst Moring; Kenneth William John Raines, both of Sutton Coldfield, England

[73] Assignee: Dunlop Limited, London, England

[21] Appl. No.: 678,123

[22] Filed: Apr. 19, 1976

[30] Foreign Application Priority Data

Apr. 25, 1975 United Kingdom .............. 17175/75

[51] Int. Cl.$^2$ ..................... B32B 27/34; F16L 11/08
[52] U.S. Cl. .................................. 428/36; 138/125; 138/126; 138/132; 138/137; 138/177; 156/308; 156/333; 156/176; 156/178; 428/395; 428/474; 428/519; 428/520; 428/522; 428/521; 428/375; 428/378; 152/330 R
[58] Field of Search ............... 428/395, 375, 474, 378, 428/36, 519, 520, 521, 522; 138/125, 126, 132, 137, 177; 156/110 A, 178, 176, 308, 333; 152/330 R

[56] References Cited

U.S. PATENT DOCUMENTS

| | | | |
|---|---|---|---|
| 2,556,885 | 6/1951 | Ness | 428/474 |
| 2,652,353 | 9/1953 | Wilson | 428/395 |
| 3,030,230 | 4/1962 | Atwell | 428/474 |
| 3,240,660 | 3/1960 | Atwell | 428/395 |
| 3,549,481 | 12/1970 | Cesare | 428/395 |
| 3,596,696 | 8/1973 | Freytag | 428/474 |
| 3,816,361 | 6/1974 | Morita | 428/395 |
| 3,817,778 | 6/1974 | Wright | 428/395 |
| 3,950,589 | 4/1976 | Togo | 428/395 |
| 3,951,887 | 4/1976 | Tanimura | 428/474 |
| 3,956,566 | 5/1976 | Gilo | 428/474 |

FOREIGN PATENT DOCUMENTS

| | | | |
|---|---|---|---|
| 628,466 | 8/1949 | United Kingdom | 428/395 |

*Primary Examiner*—Ellis Robinson
*Attorney, Agent, or Firm*—Stevens, Davis, Miller & Mosher

[57] ABSTRACT

The invention relates to a method of bonding certain aromatic polyamide to nitrile rubber compositions by applying to an aromatic polyamide a coating of a vinyl chloride polymer, preferably as a latex or plastisol, assembling the coated aromatic polyamide with the rubber composition and vulcanizing the rubber in contact with the coated aromatic polyamide. Preferably both the coating and rubber composition contain aldehyde condensation resin-forming ingredients or a partially condensed aldehyde resin. The reinforced composites produced are useful in hose, belting or tires.

23 Claims, No Drawings

REINFORCED ELASTOMERIC ARTICLES

This invention relates to bonded articles and in particular to such articles comprising nitrile rubber compounds bonded to certain aromatic polyamide materials as hereinafter defined. The aromatic polyamides utilised in the method and reinforced articles of the present invention are those which, if manufactured as fibres, would be termed aramids.

Aramids, such as for example those available under the trade names Kevlar (Du Pont Co.) and Nomex (Du Pont Co.) provide a low density reinforcement compared to steel and in the case of Kevlar provide a tensile strength similar to that of steel with a density 0.2 times that of steel. Adhesive systems are known for bonding these materials to natural, styrene/butadiene copolymer and polychloroprene rubbers. These systems in the case of Kevlar involve treating the reinforcement filaments or cords with an epoxy dip which is followed by a resorcinol/formaldehyde/rubber latex, i.e. R F L, dip. In addition, active ingredients which assist the chemical formation of the bond may also be added to the rubber compound. Such systems do not give an effective bond to nitrile rubbers and in fact only give a bond strength of the order of 40–80 N/cm using a standard pull-through test.

Nitrile rubbers have particular importance in reinforced elastomeric articles when oil resistant properties are required. These are needed for example in oil discharge hose, in particular large bore floating hose (where the low density of the aramid reinforcement compared to steel assists in providing buoyancy economically), hydraulic hose, tyres, and drive belts of the cogged type now used for engine camshaft drives. In many of these articles also high reinforcement strength is desirable and thus aromatic polyamides may be advantageously used.

According to one aspect of the present invention a method of bonding an aromatic polyamide as hereinbefore defined to a nitril rubber composition comprises applying to the aromatic polyamide a coating of a vinyl chloride polymer, assembling the coated aromatic polyamide with the rubber composition and vulcanising the rubber in contact with the coated aromatic polyamide.

According to a further aspect of the present invention a reinforced elastomeric composite comprises a vulcanised nitrile rubber composition bonded to a vinyl chloride polymer coated aromatic polyamide as hereinbefore defined.

It is to be understood that the term vinyl chloride polymer embraces poly(vinyl chloride) and copolymers of vinyl chloride with one or more other monomers. Suitable other monomers are e.g. vinyl esters and alkyl acrylates. Copolymers should preferably have a vinyl chloride unit content of at least 50 weight percent. An example of a suitable copolymer is a copolymer of vinyl chloride and methyl acrylate, with or without a further monomer e.g. a further acrylate, for instance that available under the trade name Breon 351 from British Petroleum Chemicals International Limited.

Preferably, aldehyde condensation resin-forming ingredients are included either in the vinyl chloride polymer coating or the nitrile rubber composition and more preferably in both. Examples of suitable aldehyde condensation resin-forming ingredients are an aromatic hydroxy compound, especially one having two hydroxyl groups meta to each other such as resorcinol, phloroglucinol or 1,3-dihydroxynaphthalene, and a compound which liberates methylene groups on heating such as hexamethylene tetramine, hexamethoxymethyl melamine, lauryloxymethyl pyridinium chloride, cetyloxymethyl pyridinium chloride, ethyloxymethyl pyridinium chloride or a polymer of formaldehyde. Alternatively a partially condensed aldehyde condensation resin may be included in either the vinyl chloride polymer coating or nitrile rubber composition or both.

Resin-forming ingredients or a partially condensed resin (hereafter collectively referred to as resin ingredient) when present in the vinyl chloride polymer coating are preferably in an amount of up to 10 parts by weight based on 100 parts dry weight of vinyl chloride polymer. When a resin ingredient is employed in the nitrile rubber composition it may be present in an amount of up to 20 parts by weight per 100 parts by weight of nitrile rubber.

Preferably, the vinyl chloride polymer coating is applied in latex form. When resin ingredient is used it should preferably be miscible with water and more preferably be water soluble. A latex dipped aromatic polyamide must be dried before assembly with a nitrile rubber composition.

Alternatively, the vinyl chloride polymer coating is in plastisol form, and a stabiliser such as tribasic lead sulphate and a viscosity depressant such as an alkylaryl polyether alcohol (available under the trade name Triton X 45 from Rohm & Haas Co.) or trichloroethane may be included. A plastisol coated aromatic polyamide may be dried before assembly with a nitrile rubber composition or may be assembled wet.

Another method which may be used is to blow vinyl chloride polymer powder onto an aromatic polyamide which has been treated with, e.g. dipped in, a solvent. The coated polyamide is then assembled with the nitrile rubber composition which is subsequently vulcanised.

The preferred aromatic polyamide for use in the present invention is poly(p-phenylene terephthalamide):

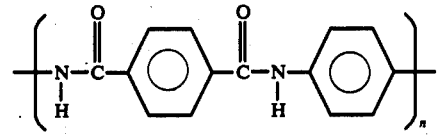

which is available under the trade name Kevlar from Du Pont De Nemours. Alternatively poly(m-phenylene terephthalamide)

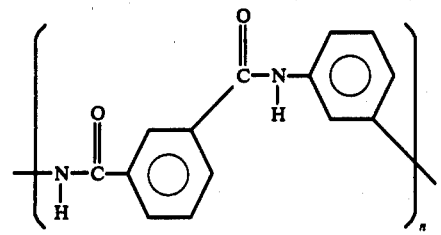

available under the trade name Nomex from Du Pont De Nemours is suitable.

It has generally been necessary when bonding aramids to elastomers other than nitrile rubber to use an epoxy dip before applying a resorcinol/formaldehyde/- rubber latex dip, but the method of the present invention obviates this and thus The aromatic polyamide is suitably in the form of a reinforcement, e.g. in fibre form (aramid), in the nitrile rubber composition.

The invention is illustrated by the following Examples in which all parts are by weight.

EXAMPLE I

Nitrile rubber compositions were made up from the following formulations 'A' and 'B'.

|  | 'A' | 'B' |
|---|---|---|
| Nitrile rubber (Krynac 3450 available from Polymer Corporation Limited) | 100 | 100 |
| Magnesium carbonate coated sulphur | 1.5 | 1.5 |
| N-cyclohexyl-2-benzthiazyl sulphenamide (Vulcafor HBS from ICI) | 1.0 | 1.0 |
| Stearic acid | 2.0 | 0.6 |
| *Resorcinol stearate | 0 | 3.6 |
| Hexamethylene tetramine | 0 | 1.8 |
| Zinc oxide | 5.0 | 5.0 |
| Dialphanol phthalate (a plasticizer based on the phthalates of $C_7$ to $C_9$ aliphatic alcohols. Alphanol is a trade name) | 10.0 | 10.0 |
| Acetone/diphenylamine reaction product (Nonox B available from I C I) | 1.0 | 1.0 |
| N 330 Carbon black | 50.0 | 50.0 |
| N-cyclohexyl-thiophthalimide (a prevulcanisation inhibitor available from Monsanto under its trade name Santoguard) | 0 | 0.4 |

*Resorcinol stearate contributes 2.2 parts resorcinol and 1.4 parts of stearic acid.

A vinyl chloride copolymer latex composition including resin-forming ingredients was prepared from the following

| | 'C' | |
|---|---|---|
| | Wet Weight | Dry Weight |
| Vinyl chloride/methylacrylate copolymer (Breon 351) | 100 | 56 |
| Resorcinol | 2.8 | 2.8 |
| Hexamethylene tetramine | 1.68 | 1.68 |
| Water | 97.12 | 0 |

The resin-forming ingredients were dissolved in the water prior to addition to the latex. The total solids content of the latex was 30% by weight.

A vinyl chloride copolymer latex composition 'D' was prepared as above but excluding resin-forming ingredients.

A 2/167 tex Kevlar cord was coated with copolymer latex composition 'C' and then dried. The dry coated cord was assembled between two slabs of the nitrile rubber composition 'A' and the rubber was vulcanised under pressure in a mould for 40 minutes at 150° C. The static adhesion results below were obtained by using the 'T' type single cord standard pull through test (see Transaction I.R.I. Volume 32 No 1 pages 1 to 18 1956 J. O. Wood). The procedure was repeated but using copolymer latex composition 'D' and then twice more using rubber composition 'B' instead of 'A'. Nomex cord was substituted for Kevlar and the procedure was repeated using only copolymer latex composition 'C'. The results obtained for each are given below:

| | Adhesion using Kevlar (N/cm) | Adhesion using Nomex (N/cm) |
|---|---|---|
| Rubber composition 'A' (no resin-forming ingredients) to copolymer latex 'D' (no resin-forming ingredients) | 120 | — |
| Rubber composition 'A' (no resin-forming ingredients) to copolymer latex 'C' (resin-forming ingredients) | 145 | 130 |
| Rubber composition 'B' (resin-forming ingredients) to copolymer latex 'D' (no resin-forming ingredients) | 150 | — |
| Rubber composition 'B' (resin-forming ingredients) to copolymer latex 'C' (resin-forming ingredients) | 200 | 176 |

Similar results were obtained for bonding rubber compositions 'A' and 'B' to Kevlar or Nomex cords substituting, for 'C', a latex according to the following formulation 'C¹' which includes different resin-forming ingredients to those in 'C':

| | 'C' | |
|---|---|---|
| | Wet Weight | Dry Weight |
| Vinyl chloride/methyl acrylate copolymer (Breon 351) | 100 | 56 |
| Hexamethoxymethyl melamine | 1.1 | 1.1 |
| Resorcinol | 1.0 | 1.0 |
| Water | 91.6 | 0 |

The total solids content of the latex was 30% by weight.

EXAMPLE II

Poly(vinyl chloride) plastisols were prepared according to the following formulations:

| | 'E' | 'F' |
|---|---|---|
| P V C (Norvinyl P10) | 100 | 100 |
| Diisooctyl phthalate | 45 | 45 |
| Tribasic lead sulphate | 5 | 5 |
| Resorcinol | 0 | 5 |
| Hexamethylene tetramine | 0 | 3 |
| Trichloroethane (Genklene) | 50 | 50 |

A 2/167 tex Kevlar cord was coated with a plastisol according to formulation 'E', dried and assembled between two nitrile rubber slabs made according to formulation 'A' given in Example I. The rubber was then vulcanised for 40 minutes at 150° C in contact with the coated Kevlar cord. The adhesion obtained was tested by pull through. The procedure was repeated using instead of formulation 'A', formulation 'B', and then using formulation 'F' instead of 'E' with both rubber formulations 'A' and 'B'. The results obtained are given below:

| | Adhesion using Kevlar (N/cm) |
|---|---|
| Rubber composition 'A' (no resin-forming ingredients) to plastisol 'E' (no resin-forming ingredients) | 110 |
| Rubber composition 'A' (no resin-forming ingredients) to plastisol 'F' (resin-forming ingredients) | 140 |
| Rubber composition 'B' (resin-forming ingredients) to plastisol 'E' (no resin-forming ingredients) | 150 |
| Rubber composition 'B' (resin-forming ingredients) to plastisol 'F' (resin-forming ingredients) | 180 |

Similar results were obtained to those above when Kevlar cord coated with plastisol formulations 'E' and 'F' were bonded directly into rubber composition 'B' without drying.

Similar results were obtained when bonding rubber compositions 'A' and 'B' to Kevlar cord substituting in turn, for 'F', plastisols according to the following formulations 'G' and 'H' which include different resin-forming ingredients to those in 'F'.

|  | 'G' | 'H' |
|---|---|---|
| P V C (Norvinyl P10) | 100 | 100 |
| Diisooctyl phthalate | 45 | 45 |
| Tribasic lead sulphate | 5 | 5 |
| Hexamethoxymethyl melamine | 2.9 | 0 |
| Resorcinol | 2.5 | 0 |
| Phloroglucinol | 0 | 1.5 |
| Paraformaldehyde | 0 | 0.8 |
| Trichloroethane | 100 | 100 |

Having now described our invention what we claim is:

1. A method of bonding an aromatic polyamide which, if manufactured as a fibre, would be termed an aramid to a nitrile rubber composition comprises applying to the aromatic polyamide a coating of a vinyl chloride polymer, assembling the coated aromatic polyamide with the rubber composition and vulcanising the rubber in contact with the coated surface of said aromatic polyamide.

2. A method according to claim 1 wherein the vinyl chloride polymer is applied in the form of a latex and the latex-coated aromatic polyamide is dried before assembly with the rubber composition.

3. A method according to claim 1 wherein the vinyl chloride polymer is applied in the form of a plastisol.

4. A method according to any of the preceding claims wherein the rubber composition includes aldehyde condensation resin-forming ingredients or a partially condensed aldehyde resin.

5. A method according to claim 4 wherein the amount of resin-forming ingredients is up to 20 parts by weight per 100 parts by weight of nitrile rubber.

6. A method according to claim 1 wherein the vinyl chloride polymer includes aldehyde condensation resin-forming ingredients or a partially condensed aldehyde resin.

7. A method according to claim 6 wherein the coating includes resin-forming ingredients in an amount of up to 10 parts by weight per 100 parts by weight of dry vinyl chloride polymer.

8. A method according to claim 1 wherein the resin-forming ingredients are an aromatic hydroxy compound and a compound which liberates methylene groups on heating.

9. A method according to claim 8 wherein the aromatic hydroxy compound has two hydroxyl groups meta to each other.

10. A method according to claim 9 wherein the aromatic hydroxy compound is selected from the groups consisting of resorcinol, phloroglucinol and 1,3-dihydroxynaphthalene.

11. A method according to claim 8 wherein the compound which liberates methylene groups on heating is hexamethylenetetramine or a polymer of formaldehyde.

12. A method according to claim 8 wherein the compound which liberates methylene groups on heating is hexamethoxymethyl melamine, lauryloxy-methyl pyridinium chloride, cetyloxymethyl pyridinium chloride, or ethyloxy-pyridinium chloride.

13. A method according to claim 1 wherein the aromatic polyamide is poly(p-phenylene terephthalamide).

14. A method according to claim 1 wherein the aromatic polyamide is poly(m-phenylene terephthalamide).

15. A method according to claim 1 wherein the aromatic polyamide is in fibre form.

16. A method according to claim 1 wherein the vinyl chloride polymer is poly(vinyl chloride).

17. A method according to claim 1 wherein the vinyl chloride polymer is a copolymer of vinyl chloride and one or more other monomers.

18. A method according to claim 17 wherein the copolymer is a copolymer of vinyl chloride and a vinyl ester or an acrylate.

19. A method according to claim 17 wherein the copolymer has a vinyl chloride unit content of at least 50 weight percent.

20. A method according to claim 17 wherein the copolymer is a copolymer comprising vinyl chloride and methyl acrylate units.

21. A composite article comprising a vulcanised nitrile rubber composition bonded to a vinyl chloride polymer coated surface of an aromatic polyamide which, if manufactured as a fiber, would be termed an aramid.

22. An article according to claim 21 wherein the aromatic polyamide is in the form of a fibrous reinforcement for the nitrile rubber composition component.

23. An article according to claim 21 which is a hose pipe.

* * * * *